Figure 1:
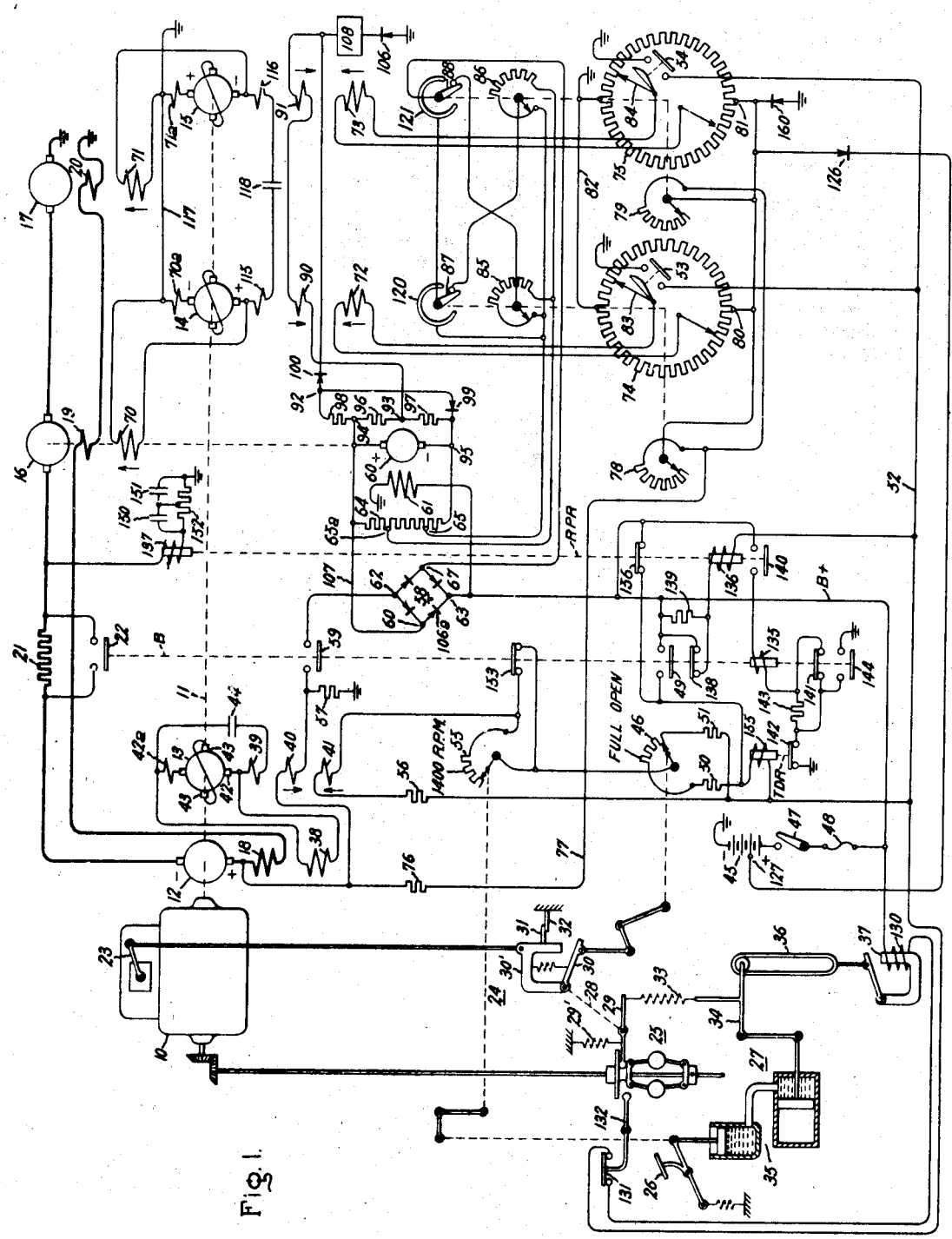

Jan. 29, 1946.    G. M. ADAMS ET AL    2,393,620
ELECTRIC CONTROL SYSTEM
Filed Oct. 8, 1943    2 Sheets-Sheet 1

Inventors:
George M. Adams,
John C. Aydelott,
by Harry E. Dunham
Their Attorney.

Inventors:
George M. Adams,
John C. Aydelott,
by Harry E. Dunham
Their Attorney.

Patented Jan. 29, 1946

2,393,620

UNITED STATES PATENT OFFICE 2,393,620

ELECTRIC CONTROL SYSTEM

George M. Adams and John C. Aydelott, Erie, Pa., assignors to General Electric Company, a corporation of New York Application October 8, 1943, Serial No. 505,468

15 Claims. (Cl. 172—179)

Our invention relates to electric control systems, and is particularly applicable to gas- or Diesel-electric power systems for self-propelled vehicles.

The control system forming the subject matter of this application is an improvement upon the system disclosed and claimed in a copending application, Serial No. 469,538, filed on December 19, 1942, as a joint application of Martin A. Edwards, Donald E. Garr, John C. Aydelott, and George M. Adams, and also in the copending applications, Serial No. 505,437 and Serial No. 505,469, filed concurrently herewith by Martin A. Edwards and George M. Adams, respectively, and assigned to the same assignee as the instant application. The aforementioned joint application is being amended as a joint application of Martin A. Edwards, Donald E. Garr, and John C. Aydelott. The inventions of said joint application and said Edwards application were made prior to our invention and I do not claim herein anything shown or disclosed in said applications, which are to be regarded as prior art with respect to our present invention.

Diesel-electric power systems for self-propelled vehicles ordinarily comprise a prime mover, such as a Diesel or other internal combustion engine, arranged to drive a generator from which power is supplied to one or more traction motors. The systems of this type which are in more or less common use at the present time make use of traction motors of the series field type and rely upon voltage control of the generator for controlling the torque and speed of the motors, and reversing switches for controlling their direction of rotation. While such a system is suitable for application to vehicles in which all motors simultaneously undergo like changes of speed and torque, such as in Diesel-electric locomotives, buses, and the like, they are not sufficiently flexible to supply the demands of certain other types of vehicles in which an optimum maneuverability is desired. This is especially true of such vehicles as tractors, electric shovels, military tanks, and the like, which rely upon the independent control of laterally spaced driving elements for propulsion, steering, and braking. Essentially the same problems of propulsion, steering, and braking are encountered in twin-screw or paddle-wheel boats, although the difficulty in these applications is minimized to some extent insofar as extreme rapidity of response, while it may be provided, is ordinarily not necessary.

For applications of the above nature, controlled current systems have been proposed. By such a system we mean one in which the main generator is connected in a loop circuit with the motor armatures and arranged to supply to the armatures a constant or otherwise continuously controlled unidirectional current, while the excitation of the motor field windings is separately and independently controlled to determine the speed, torque, and direction of rotation of each of the motors. Such a system is shown in broad outline in British Patent 226,960, and satisfactorily meets the principal demands of maneuverability outlined above. For example, it will be evident that both motors may be suddenly reversed to effect dynamic braking merely by reversing the relatively small energizing current to their field windings, while the unidirectional armature current is maintained constant or within predetermined limits. Similarly the torque of any one motor may be reduced or, in fact, reversed to effect steering. It is also evident that an inherent advantage of this arrangement is that if during steering, one of the motors is exerting a reverse torque, or in other words, is being braked and acting as a generator, the power output of the generating motor is supplied to the motor or motors exerting a forward motoring torque thereby minimizing the amount of power necessary to be supplied by the main generator. The power saving resulting from such an arrangement, as compared with one in which the braking effort is dissipated in heat, has been shown to be substantial over a course consisting of a large number of turns, such as may characterize the run of a military tank, or the like.

While controlled current systems of the general type shown in the British patent above referred to are suitable and satisfactory for marine applications, they have not heretofore been applied to land vehicles or to industrial applications in spite of their obvious advantages with respect to maneuverability. The reason is evident when it is appreciated that, while the system of the British patent meets the principal demands of maneuverability, it is not characterized by rapid speed of response. Such response is not ordinarily necessary in ship propulsion apparatus. A land vehicle on the other hand, especially one which is to be operated in close proximity to a number of other vehicles and over irregular terrain, must possess not only maneuverability but also an extremely rapid rate of response. Furthermore, certain characteristic problems of land vehicle operation, such as overspeeding in running downhill, must be provided against by suitable protective means. Similar problems also are encountered in certain industrial processes where the loan at times overhauls the motor.

Accordingly, it is a general object of our invention to provide an improved electric control system, of substantially unlimited flexibility which is reliable, easy to operate and possessed of a very rapid rate of response.

It is another object of our invention to provide a new and improved traction motor control system having a continuous transition from accelerating to electric braking operation and arranged for prompt and simple transfer from one phase of operation to the other at any time without danger of overloading or overspeeding of any of the elements of the system.

It is still another object of our invention to provide an electric traction motor control system for a plurality of motors so arranged that any or all motors may be independently transferred between accelerating to electric braking operation substantially instantaneously and in a continuous manner without overloading or overspeeding of any part of the system.

It is another object of our invention to provide in a gas- or Diesel-electric controlled current system means for providing a maximum current limit and means for changing the current limit value in accordance with steering demands of the vehicle.

It is a still further object of our invention to provide, in an electric motor control system for a vehicle of the type steered by independent torque control of laterally spaced driving motors, means for limiting the motor current to a selectable maximum value and means for controlling the current limit value in accordance with the degree of steering demanded.

Our invention also has for its object the provision, in a controlled current electric driving system for a track-laying vehicle, of means for temporarily raising the maximum current limit to permit abrupt steering operation.

According to our invention the above and other objects are attained by providing an electric power system, and particularly, a gas- or Diesel-electric power system comprising a prime mover, a generator, and a plurality of traction motors in which a unidirectional direct current of continuously controlled and definitely limited magnitude is circulated through the motor armatures, and means are provided for separately controlling the excitation of the motor field windings independently to determine the speeds, torques, and directions of rotation of the motors. By proper selection of forward and reverse torques for the separate motors, steering and forward or reverse motoring or electric braking operation may be effected without affecting the direct control of the continuously circulating armature current. To facilitate steering, means are also provided for automatically increasing the torque of the motors on one side of the vehicle whenever the torque of the motors on the other side of the vehicle is decreased. Severe steering is further facilitated by providing automatic means for temporarily raising the maximum current limit when the motors on only one side are reversed, while forward torque is retained on the motors on the other side of the vehicle.

Preferably we provide an engine driven generator having an output circuit including the armatures of all the traction motors connected in series circuit relation. The generator may be of the constant current type, although for more efficient utilization of the maximum available engine horsepower over a wide range of vehicle speed, it is preferable to limit the voltage-current characteristic by maximum available engine horsepower in the region between maximum generator voltage, as determined by saturation, and maximum generator current, as determined by armature reaction or a suitable current limit circuit. Each traction motor is also provided with a separate engine driven exciter provided with manually controlled excitation means to permit a smooth or continuous transition of motor excitation from maximum forward excitation to maximum reverse excitation. For any predetermined setting of the manually adjustable motor field control means, the motor exciter field and hence the motor field energization may be constant or may be connected to vary in accordance with motor current, motor voltage, or motor speed, or any combination of these. In this system line current is limited by an electric valve spill-over circuit for reducing the generator excitation upon occurrence of a predetermined current, the spill-over value being reduced as vehicle speed increases, and increased to meet certain demands of steering. An electric valve spill-over circuit is also arranged to reduce the power output of the motors whenever the vehicle attains a predetermined limiting speed.

Figure 2:
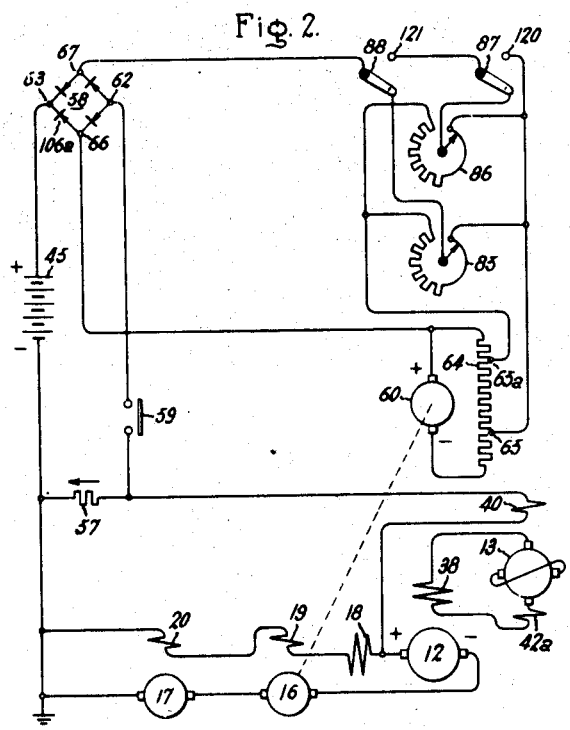
Figure 3:
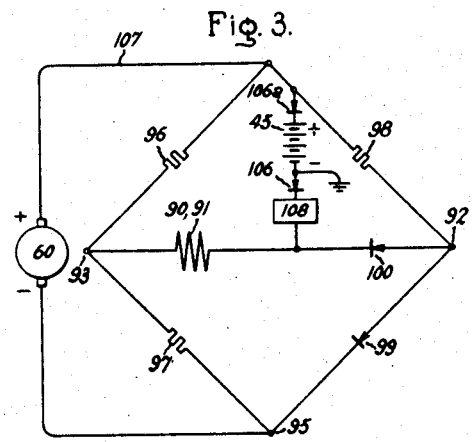
Figure 4:
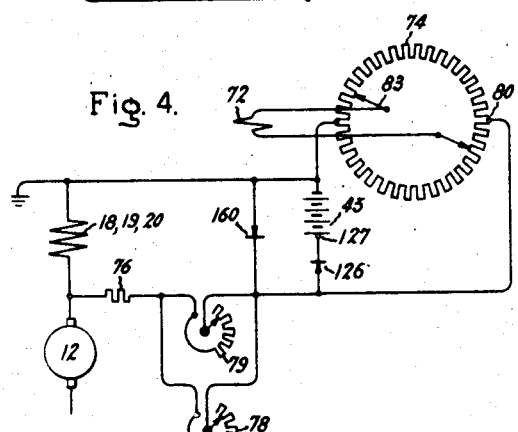

For a more complete understanding of our invention and a further appreciation of its objects and advantages, reference should now be had to the following detailed specifications taken in conjunction with the accompanying drawings in which Fig. 1 is a schematic circuit diagram of connections for an electric power system embodying our invention; Fig. 2 is a simplified circuit diagram of the current limit circuit; Fig. 3 is a simplified schematic circuit diagram of the vehicle speed limit circuit; Fig. 4 is a simplified schematic circuit diagram of the main motor field energizing circuit; and Figs. 5, 6, 7 and 8 are graphical representations of various operating characteristics of the system.

Referring now to the drawings, and particularly to Fig. 1, we have illustrated schematically therein a Diesel- or other gas-electric power system for a self-propelled vehicle. The system comprises a prime mover 10 of the internal combustion engine type, such as a Diesel engine, arranged to drive through a common shaft 11, a main generator 12, a generator exciter 13, and a plurality of traction motor exciters 14 and 15. An output circuit from the armature of the generator 12 is completed through the armatures of a pair of traction motors 16 and 17. The output circuit of the generator 12 is a series or loop circuit and includes a commutating pole winding 18 for the generator 12 and commutating pole windings 19 and 20 for the motors 16 and 17, respectively. The generator output circuit may be permanently closed, as shown, or if desired, suitable disconnecting switches may be included. We have also shown permanently connected in the output circuit a braking resistor 21 arranged to be shunted during motoring operation by the contact 22 of a braking contactor B. It will be understood, of course, that the representation of a pair of traction motors 16 and 17 is purely diagrammatic, and that each motor shown on the drawings, may represent either a single motor or a group of motors arranged either in series or parallel circuit relation. For purposes of illustration it may be assumed that each motor or motor group 16, 17 is arranged to drive the track on one side of a track-laying vehicle, such as a tractor, military tank, or the like. For example, the motor 16 may drive the left-hand track, while the motor 17 drives the right-hand track.

It is well understood that an internal combustion engine of the type described, when its speed is maintained substantially constant by a governor, is capable of delivering at its output substantially constant maximum horsepower with the throttle fully open. As shown on the drawings, an engine throttle lever 23 is controlled through an overtravel linkage 24 from a governor 25 to maintain constant the speed of the engine 10, the setting of the governor being manually controllable by means of a foot pedal 26 through a speed setting linkage 27 to select the desired constant speed. By way of example, we have shown a flyball governor 25 arranged to rotate a governor shaft 28 through a lever 29. The governor is biased to a normal collapsed position by a tension spring 29'. To the shaft 28 is rigidly connected an arm 30, and spring biased into following engagement with the arm 30 is a U-shaped link 30' which is loosely mounted upon the shaft 28 and rigidly connected to the throttle lever 23. This mechanism is so arranged that upon a decrease in engine speed the inward movement of the flyballs will rotate the shaft 28 in a clockwise direction as shown on the drawings, thereby to open the throttle and bring the engine speed substantially back to normal. The link 30' is also provided with a projection 31 arranged to engage a fixed stop 32 in the full open position of the throttle, thereby to prevent further movement of the throttle 23 but to permit overtravel of the lever 30 for a purpose to be more fully described hereinafter.

The speed setting of the governor 25 is controlled by a tension spring 33 connected between the link 29 and a bell-crank lever 34 in aiding relation with the spring 29'. The bell-crank lever 34 is connected through a suitable linkage, such as a hydraulic system 35, to the foot pedal 26 and is so arranged that depression of the foot pedal applies tension to the spring 33. We have also shown connected to the speed setting bell-crank lever 34 through a lost-motion linkage 36 a throttle solenoid 37. As will be explained more fully hereinafter, the throttle solenoid 37 is arranged to apply to the speed setting spring 33 an initial tension as soon as excitation is applied to the field winding of the generator 12, thereby to raise the engine speed to a certain predetermined minimum above idling speed. The lost motion of the link 36 permits further application of tension to the speed setting spring 33 through the foot pedal 26.

Generator field excitation

The main engine driven generator 12 is provided with a main field exciting winding 38 connected directly to the terminals of the dynamo electric exciter 13 and so controlled as to provide in the output circuit of the generator 12 a continuing unidirectional flow of direct current having a predetermined maximum or limiting value regardless of the back electromotive force of the traction motors 16 and 17. The volt-ampere characteristic of the generator 12 at any predetermined engine speed is dependent upon the energization of the main generator field winding 38 which is in turn controlled by the energization of a plurality of control field windings 39, 40 and 41 on the exciter 13.

Preferably the exciter 13 is a direct current generator of the type described and claimed in Patent 2,227,992, issued to Ernst F. W. Alexanderson and Martin A. Edwards on January 7, 1941. Such a generator is of the armature reaction excited type and is provided with a pair of current supply brushes 42, a series load compensating winding 42a, and a pair of short circuited brushes 43. The control field windings 39, 40, and 41 are arranged to generate a voltage between the short circuited brushes 43, and the armature reaction of the current flowing through the short circuited connection as a result of this voltage sets up a flux in such a direction as to provide an output voltage at the load brushes 42 which is proportional to the excitation of the machine along its short circuit axis. One of the desirable characteristics of an armature reaction excited generator of this type is that its output voltage responds very rapidly and with a high degree of amplification to any change in the energization of its control field windings. For this reason machines of this type are frequently referred to as dynamoelectric amplifiers.

Referring now more particularly to the control field windings of the generator exciter 13, the winding 39 is a stabilizing or antihunt winding connected directly across the load terminals of the exciter in series with a capacitor 44. The field winding 39 is thus excited only upon a change in exciter voltage and in a direction to oppose the change. The main control of the generator exciter voltage is attained through the generator exciter forward field 41 and the differential field 40. Fundamentally, the forward control field winding 41 is excited from a substantially constant voltage source of control power, such as a battery 45, while the differential field winding 40 opposes the winding 41 and is connected in shunt to the commutating pole windings 18, 19, and 20 in the generator output circuit for response in accordance with the main line current. The excitation of the differential field winding 40 is modified by certain auxiliary circuits which will be considered in greater detail hereinafter. Specifically, the forward control field winding 41 is energized across a governor controlled potentiometer 46, which is connected across the terminals of the battery 45 through a circuit which may be followed from the positive terminal of the battery through a disconnect switch 47, a suitable protective fuse 48, a wire B+, a normally open interlock contact 49 on the braking contactor B, a resistor 50, the potentiometer 46, a resistor 51, and a ground wire 52 which in operation is connected to the negative terminal of the battery 45 through ground and one or the other of a pair of manually operable "dead man" interlock contacts 53, 54 which will be more fully described hereinafter. The control field winding 41 itself is connected across the potentiometer 46 through a pedal controlled variable resistor 55 and a fixed resistor 56.

The various parts of the governor controlled mechanism are shown with the flyballs completely collapsed so that the throttle linkage is in the full open position of the throttle and the overtravel linkage is in the position of maximum overtravel. When the engine is at standstill the springs 29' and 33 normally hold the throttle and overtravel linkages in the positions shown. When the engine is set in operation the governor balls immediately fly out and close the throttle down to its idling position as determined by the initial tension of the springs 29' and 33. In moving the throttle to its idling position the governor also moves the slider of the potentiometer 46 to its extreme counterclockwise position as viewed at Fig. 1. It will now be observed that the potentiometer 46 is arranged to effect no change in the voltage applied to the control field winding 41 during movement of the throttle from its idling position to its full open position. If, however, when the throttle is in its full open position, the engine is still unable to maintain the desired speed, the governor 25, through the overtravel linkage 24, will continue to move the lever 30 and the slider of the potentiometer 46, even though no further movement of the link 30 and the throttle lever 23 is possible because of the stop 32. Such overtravel of the governor will, through the potentiometer 46, reduce the voltage applied to the generator exciter forward field winding 41, thereby to reduce the excitation of the generator exciter 13 and the main generator 12 and to permit the engine to again come up to the desired speed. By this arrangement the power demand of the engine driven generator 12 is reduced in the middle range of its volt-ampere characteristic where it normally exceeds the maximum available horsepower output of the engine 10, thereby to prevent slight engine stalling within this range and to permit maximum utilization of all available engine horsepower over a wide range of vehicle speed.

The purpose of the pedal rheostat 55 is to select a suitable generator excitation in accordance with the selected engine speed to permit easy starting of the vehicle and easy maneuvering at low speed. The rheostat 55 is arranged to effect no change in the speed range but to reduce the generator exciter field resistance over an initial portion of the field resistance over the major portion of the throttle travel. Thus as the slider of the throttle resistor 55 is moved from its extreme counterclockwise idling position by accelerating movement of the foot pedal 26, the resistance 55 is gradually excluded from the circuit and the exciter excitation built up as the engine speed increases. Preferably, the resistor 55 is arranged to be completely cut out at a relatively low engine speed. For example, if the engine is arranged to have a minimum running speed of 1200 R. P. M. with the throttle solenoid 37 closed, it has been found suitable to completely cut out the resistor 55 when the engine reaches a selected low speed of approximately 1400 R. P. M., as has been indicated on the drawings. Thus it will be observed that for throttle openings greater than that corresponding to the selected low speed and less than full open neither the governor potentiometer 46 nor the rheostat 55 exerts any control of the energization of the control field winding 41 so that energization of the winding 41 is substantially constant within the range of throttle positions. It will be understood that variation of the field resistance 55 is not fundamental but that, if desired, a fixed resistor may be substituted therefor. Beyond the full open position of the throttle the governor 25 functions to reduce the power demand of the generator to equal the maximum available horsepower output of the engine by control of the generator forward field 41 through the potentiometer 46.

As previously mentioned, the control field winding 40 is a differential winding and is arranged when energized to excite the generator exciter field in opposition to the flux of the winding 41. The field winding 40 is connected across the commutating pole windings 18, 19, and 20 in the generator output circuit and is thus energized in accordance with main line current, thereby to cause the output voltage of the generator 12 to drop from a predetermined maximum value to a value just sufficient to supply the resistance drop of the output circuit when maximum current is flowing. The normal energization circuit of the winding 40 may be followed from the positive terminal of the generator 12 through the winding 40 and a current limiting resistor 57 to ground.

*Line current limit*

For the purpose of limiting the current in the generator output circuit to a predetermined maximum value, supplementary means are provided for abruptly increasing the energization of the exciter differential winding 40 when the line current attains such predetermined maximum value. The current limit circuit may be more readily understood from the simplified diagram of Fig. 2. At Fig. 2 the connection of the exciter differential winding 40 across the commutating pole windings 18, 19, and 20 in series with the resistor 57 is clearly shown. To provide maximum current limit, the resistor 57 is shunted by a circuit including the battery 45, a rectifier bridge 58, and a normally open interlock contact 59 of the braking contactor B. As pointed out hereinbefore, the braking contactor B is picked up during motoring operation so that the shunt circuit around the resistor 57 will be closed. It will be observed that both arms of the rectifier bridge are connected to block any flow of current from the battery 45 through the resistor 57. Furthermore, the generator polarity is such that when current is flowing through the output circuit in the normal direction, the side of the resistor 57 connected to the negative side of the battery is negative, and the side of the resistor connected through the rectifier bridge to the positive side of the battery is positive, so that the voltage drop across the resistor 57 opposes the voltage of the battery through the blocking rectifier bridge 58, the rectifiers preventing any flow of current through the loop circuit from the battery. It will now be evident that when the current flowing in the output circuit of the generator 12, and hence the current flowing through the exciter differential winding 40 and the resistor 57, attains such a value that the voltage drop across the resistor is greater than the voltage of the battery 45 by an amount sufficient to break down the rectifiers in the arms of the bridge 58, current will spill over from the positive terminal of the resistor 57 through the battery 45 thereby to provide a current path parallel to the resistor 57 and in series with the differential control field 40. By thus introducing a shunt connection around the resistor 57 the net resistance of the circuit through the control field winding 40 is reduced and the energization of the winding 40 is sharply increased thereby to diminsh the excitation of the generator exciter 13 and cut down the excitation of the main generator 12. The main line current at which the above spill-over operation takes place is the maximum current limit for the generator output circuit. The added energization thus supplied to the control field winding 40 is sufficiently great so that no further increase in the main line current is possible after operation of the current limit circuit.

Viewed in another way, the above current limit circuit may be regarded as limiting the potential of the positive terminal of the generator 12 to the battery potential plus the small resistance drop through the control field 40. Thus, whenever the positive terminal of the resistor 57 exceeds battery potential sufficiently to render the rectifier bridge conducting, the positive terminal of the battery 45 is effectively tied directly to the positive terminal of the generator 12, since the rectifiers in the bridge 58 and the winding 40 are of low resistance. Any tendency of the line current to raise the potential of the positive generator terminal above battery potential results in a large flow of current through the control field winding 40 sufficient to reduce the generator excitation to a value only great enough to maintain the limited current.

It is desirable to reduce the maximum current limit as the vehicle speed increases, that is, the current limit circuit should be brought into operation at a somewhat lower line current when the vehicle speed is high than when the vehicle speed is low. This condition is imposed by the limits of good commutation by the traction motors 16 and 17. It is well understood that the maximum current which may be satisfactorily commutated at high speed is less than that which may be satisfactorily commutated by the same machine at a lower speed. For this purpose we provide a tachometer generator 60 having a separately excited field winding 61 energized directly from the battery 45 through the wire B+. The tachometer generator 60 is driven from the shaft of one of the traction motors, for example, the traction motor 16, and thus supplies an output voltage proportional to vehicle speed for modifying the operation of the current limit circuit. From the discussion of the preceding paragraph it will be recalled that the shunt circuit across the resistor 57 is connected through diagonally opposite points of the rectifier bridge 58. These points have been identified as 62 and 63 in Figs. 1 and 2. Referring now particularly to Fig. 2, it will be observed that a potentiometer 64 having voltage taps 65 and 65a is connected across the output terminals of the tachometer generator 60 to supply to the other pair of diagonally opposite points 66 and 67 of the rectifier bridge 58 a suitable voltage proportional to vehicle speed.

The speed voltage between the terminals 66 and 67 of the rectifier bridge 58 is normally derived between the positive terminal of the potentiometer 64 and the tap 65. As shown at Fig. 2, the rectifier bridge terminal 66 is connected to the positive terminal of the potentiometer 64. Between the taps 65 and 65a of the potentiometer 64 are connected a pair of potentiometers 85 and 86 in parallel circuit relation. The potentiometers 85 and 86 are effective only in steering operation in a manner hereinafter to be described. A pair of switches 87 and 88 serve selectably to connect the bridge terminal 67 either directly to the potentiometer tap 65 or to the slider of one of the potentiometers 85, 86. The switches 87 and 88 and the potentiometers 85 and 86 serve temporarily to raise the current limit for severe steering operation. This modification of the current limit by steering will be more readily understood after the steering operation itself has been described. For the present purpose of understanding the lowering of current limit as vehicle speed increases it is sufficient to neglect the potentiometers 85 and 86, since these potentiometers are ineffective in straight running and braking operation. Accordingly, unless steering is demanded, the bridge terminal 67 may be regarded as connected directly to the potentiometer tap 65.

Due to the rectifying action of the bridge 58 the speed voltage across the terminals 66 and 67 may be regarded as appearing permanently between the points 63 and 62 of the bridge regardless of the direction of motion of the vehicle, the point 63 being positive with respect to the point 62. From Fig. 2 it may also be observed that in the loop circuit comprising the battery 45, the rectifier bridge 58, and the resistor 57, the voltage drop across the resistor 57 and the speed voltage across the points 62 and 63 of the rectifier bridge 58 are connected additively and in opposing relation to the voltage of the battery 45. Thus for current limit operation the total voltage available for opposing the battery voltage to effect a spill-over of current through the rectifier bridge and the battery from the positive terminal of the resistor 57 is increased in proportion to the speed of the vehicle by the voltage between the points 62 and 63 of the rectifier bridge. Since the battery voltage is constant, it will be clear that as the vehicle speed increases, spill-over through the battery and hence current limit operation will take place with progressively smaller voltage drops across the resistor 57, that is, at reduced main line current, since the voltage drop across the resistor 57 is proportional to the main line current. In this way the maximum current limit is reduced as the vehicle speed increases.

*Traction motor field control*

Referring now to the field control for the traction motors 16 and 17, it may first be noted that each motor is provided with a main separately excited field winding, the motor 16 having a winding 70 connected to the output terminals of the dynamoelectric exciter 14 and the motor 17 having a field winding 71 connected to the output terminals of the dynamoelectric exciter 15. Preferably the exciters 14 and 15 are machines of the armature reaction excited type, as heretofore explained in connection with the generator exciter 13 and include series load compensating windings 70a and 71a, respectively. The exciters 14 and 15 are provided also with main control field windings 72 and 73, respectively, which are energized through manually controllable potentiometer bridges 74 and 75, respectively, in accordance with the voltage drop across the commutating pole windings 18, 19 and 20 of the main generator output circuit. The energizing circuit for the windings 72 and 73 may be traced from the positive terminal of the engine driven generator 12 through a resistor 76, a wire 77, and in parallel through a pair of variable resistors 78, 79 to the points 80 and 81 on the potentiometer bridges 74 and 75, respectively, and hence through both sides of both potentiometers in parallel to a grounded wire 82. Thus the voltage appearing across each potentiometer 74 and 75 from the points 80 and 81 to ground is proportional to the current in the generator output circuit as indicated by the voltage drop across the commutating pole windings 18, 19 and 20. A suitable voltage for application to the motor exciter field windings 72 and 73 is selected on the potentiometers 74 and 75 by means of manually positionable steering handles 83 and 84, respectively.

It is desirable at this point to note certain mechanical features of the steering handles 83 and 84. Primarily these handles have for their purpose the determination of the standard of energization of the motor field windings 70 and 71 by selection from the potentiometers 74 and 75 of a suitable voltage proportional to line current for application to the motor exciter field windings 72 and 73. It will also be noted that the "dead man" interlock switches 53 and 54 previously mentioned are actuated by handle levers attached to the steering handles and that these switches are arranged to be closed as soon as the handles are grasped by an operator. Preferably, as indicated in the drawings, the steering handles 83 and 84 are biased to a normal position such that substantially full forward voltage is applied to the control field windings 72 and 73. The steering handles are also arranged to operate a number of auxiliary switches and rheostats. For example, the rheostats 78 and 79 are arranged to be fully in circuit when the steering handles 83 and 84 are in their normal positions and are connected respectively to the handles 83 and 84 for movement therewith to cut out resistance as the handles are drawn back toward the null points of the potentiometer bridges. The rheostats 78 and 79 are arranged to be fully cut out when the steering handles reach the null points. The purpose of these rheostats will be more fully described hereinafter in connection with automatic steering operation. In addition to the rheostats 78 and 79, the steering handles 83 and 84 are also arranged to actuate the potentiometers 85 and 86 and the switches 87 and 88, respectively. The potentiometers 85, 86 and the switches 87, 88 are in the current limit circuit for steering control which will be described hereinafter, but for the present it will be sufficient to note that the sliders of the potentiometers 85 and 86 are normally at their maximum voltage positions and, since the forward halves of these potentiometers are "dead," the maximum voltage positions are maintained so long as the steering handles are forward of their null points. The potentiometers 85 and 86 become effective to reduce the tapped voltages as the steering handles are moved beyond their null points and into their reverse quadrants. The switches 87 and 88 are single-pole, double-throw switches which are normally closed on one pole so long as the steering handles are in their normal forward positions and are thrown to the other pole as soon as the connected steering handle is moved in the reverse direction a predetermined small distance fom the normal position.

It will be clear from the above description of the potentiometers 74 and 75 that with the steering handles 83 and 84 set in any predetermined position, the energization of the main control field windings 72 and 73 of the motor exciters 14 and 15 will vary in accordance with the magnitude of the main line current. Furthermore, since the exciters 14 and 15 serve as dynamoelectric amplifiers, it will be clear that the energization of the motor field windings 70 and 71 is proportional to the armature current of the motors, and that, except as modified under certain conditions explained hereinafter, the excitation characteristic of the traction motors 16 and 17 is similar to that of a series motor. It will be understood that the steering handles 83 and 84 are independently controllable so that the standard of excitation of each motor may be selected independently and set at any point between full forward field and full reverse field. The energization circuit for the motor exciter windings 72 and 73 is shown in simplified form at Fig. 4. While Fig. 4 shows only a single potentiometer bridge, it will be understood that the potentiometers 74 and 75 are connected in parallel circuit relation.

The series excitation characteristic of the traction motors 16 and 17 is desirable because it increases the speed up to which maximum utilization of available engine horsepower may be obtained. However, it has been found that even higher motor speeds than may be thus obtained are desirable at the point of maximum utilization of engine power. This demand arises in part from the fact that saturation of the motor fields at low vehicle speed in an effort to obtain maximum tractive effort for starting impairs to some extent the proportionality between line current and the motor flux. Accordingly, in order further to increase the motor speed up to which maximum utilization of engine horsepower may be obtained, we provide additional means for exaggerating the series excitation characteristic of the motors by controlling the motor excitation in inverse proportion to vehicle speed as well as in direct proportion to the main line current. For this purpose we utilize the voltage of the tachometer generator 60 to energize, in proportion to vehicle speed, a pair of differential control field windings 90 and 91 on the motor exciters 14 and 15, respectively. Referring to Figs. 1 and 3, it will be observed that the control field windings 90 and 91 are connected in series circuit relation across intermediate points 92 and 93 of a bridge circuit, the line terminals 94 and 95 of which are connected to the terminals of the tachometer generator 60. Fig. 3 clearly shows the bridge circuit which comprises a pair of resistors 96 and 97 connected in series between the terminals 94 and 95 and a resistor 98 connected in series with a rectifier 99, also between the terminals 94 and 95. The rectifier 99 is connected normally to conduct, the terminal 94 being positive. The arms of the bridge are so proportioned that the point 92 is normally positive with respect to the point 93 and the motor exciter field windings 90, 91 are connected between these points. The energizing circuit for the windings 90 and 91 may be traced from the bridge terminal 92 through a rectifier 100 and the control field windings 90 and 91 in series to the terminal 93. Thus, as the vehicle speed and tachometer voltage rise, the voltage across the bridge points 92, 93 increases proportionately. As indicated at Fig. 1 the differential control field windings 90 and 91 are energized in opposition to the main field windings 72 and 73, respectively, so that, as the energization of the windings 90 and 91 increases with increasing vehicle speed, the net excitation of the traction motor exciters 14 and 15, and hence the excitation of the traction motors 16 and 17 themselves, is reduced in proportion to the speed of the vehicle. It will be borne in mind that this effect is superposed upon the reduction of traction motor excitation due to the decrease in main line current as the vehicle speed increases and produces an exaggerated series motor characteristic.

Figure 6:
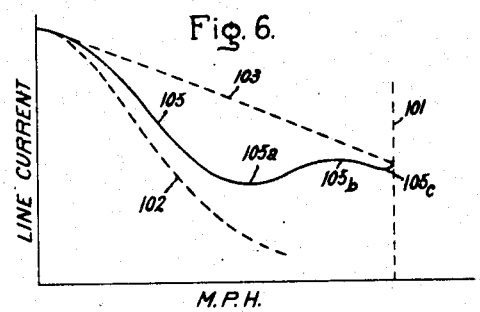
Figure 7:
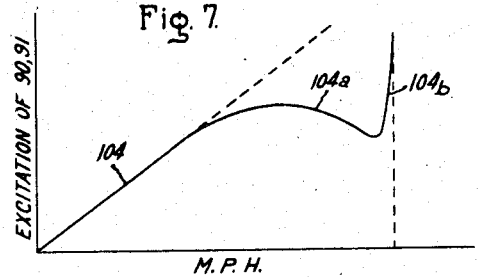

The reason for making use of the rectifier 99 as one arm of the bridge circuit of Fig. 3 will become evident from an examination of the curves of Figs. 6 and 7. The rectifier 99 serves as a nonlinear resistor which decreases its resistance as the voltage across the bridge increases. Referring first to Fig. 6, we have here shown the relation between vehicle speed and line current from zero speed up to maximum vehicle speed. The maximum vehicle speed is indicated at Fig. 6 by a line 101. The manner in which the vehicle speed is limited to this maximum will be described hereinafter, but for the present it is sufficient to note that the broken line curve 102 of Fig. 6 indicates the manner in which the line current would diminish as the vehicle speed increases were it not for the additional field weakening due to the energization of the motor exciter field windings 90 and 91. Also at Fig. 6 the straight line 103 indicates the maximum current limit which, as has been heretofore explained, diminishes as the vehicle speed increases. As described in the preceding paragraph, the excitation of the control field windings 90 and 91 increases with vehicle speed and this increase is substantially linear over a portion 104 of the curve of Fig. 7, so that the line current of Fig. 6 follows a curve 105 rather than the curve 102. As indicated at Fig. 6, the departure of the curve 105 from the curve 102 becomes more pronounced as the energization of the field windings 90 and 91, as shown in Fig. 7, increases. Thus, due to the effect of the field windings 90 and 91, the line current begins to show an increase at a portion 105a of the curve 105, and begins to approach the current limit value. Since it is undesirable that the current limit be exceeded at this point, further increase in the energization of the field windings 90 and 91 is prevented and, in fact, a net decrease in their energization may be produced by the action of the rectifier 99. The negative resistance-voltage characteristic of the rectifier 99 becomes pronounced at relatively high tachometer voltages, thereby to reduce the resistance of the bridge arm in which it lies and to preclude further increase of the voltage of bridge terminal 92 with respect to terminal 93. Indeed, the effect of the rectifier 99 may be so pronounced as to actually reduce the voltage across the control field windings 90 and 91 despite further increases of tachometer voltage (see the portion 104a of the curve 104 of Fig. 7). As indicated at Fig. 6, then, this has the effect of again reducing the line current at a portion 105b of the curve 105. By thus limiting, and in fact reducing, the energization of the windings 90 and 91 in the high speed range, an increase of the line current to the limiting value is avoided.

*Vehicle speed limit*

In addition to their function of exaggerating the series excitation characteristic of the traction motors, the motor exciter control field windings 90 and 91 are connected in circuit with the control battery 45 to provide a vehicle speed limit control and indication. For this purpose the voltage of the tachometer generator 60 is matched against the voltage of the battery 45 through a loop or spill-over circuit including the control field windings 90 and 91 of the motor exciters 14 and 15 and a pair of blocking rectifiers 106 and 106a (see Figs. 1 and 3), the rectifier 106a being in the rectifier bridge 58. The blocking rectifiers normally prevent a flow of current from the battery through the tachometer generator 60 and the field windings 90 and 91 but permit a spill-over current from the tachometer generator through the battery and the control field windings 90 and 91 to supply supplementary excitation to the field windings whenever the vehicle speed is such that the tachometer voltage, or a suitable portion thereof, exceeds the battery voltage. The spill-over connection may be traced at Figs. 1 and 3 from the positive terminal of the tachometer generator 60 through a wire 107, the rectifier 106a, the wire B+ and the battery 45 to ground, and from ground through the rectifier 106, a suitable visual or audible speed indicating device 108, the motor exciter control field windings 90 and 91, and the resistor 97 to the negative terminal of the tachometer generator 60. It will now be clear that the rectifier 100 is included in the normal or bridge excitation circuit of the field windings 90 and 91 for the purpose of preventing short circuiting of these field windings through the rectifier 99 upon spill-over in speed limit operation. From the above circuit it will be evident that the rectifiers 106 and 106a are so arranged that current cannot flow from the battery 45 through the tachometer generator 60. On the other hand, when the vehicle attains such a speed that the voltage at the output terminals of the tachometer generator attains a value greater than that of the battery voltage, these two blocking rectifiers will permit current to spill over from the tachometer generator through the battery, the overspeed indicating device 108, and the motor exciter control field windings 90 and 91. Furthermore, it is to be noted that the vehicle speed at which such spill-over will occur is substantially unaffected by changes in the battery voltage because of the fact that the tachometer generator is battery excited, so that as the battery voltage increases or decreases, the tachometer generator voltage increases or decreases proportionately.

The operation of the speed limit circuit may now be followed. It will be recalled that independently of any energization of the motor exciter control field windings 90 and 91 through the speed limit spill-over circuit traced in the preceding paragraph, these field windings are continuously excited through the bridge circuit of Fig. 3 in the manner indicated at Fig. 7. Referring now to Fig. 6, as the vehicle speed limit is approached the line current is in the region 105b of the curve 105. If now the vehicle speed becomes such that the tachometer voltage causes current to spill over through the speed limit circuit thereby to energize the over-speed indicating device 108 and to superpose additional energization upon the normal energization of the motor exciter field windings 90 and 91, the total energization of the windings 90 and 91 will increase sharply as indicated at the portion 104b of the curve of Fig. 7. Such increase in the energization of the differential windings 90 and 91 will cause a sharp decrease in the net motor exciter excitation, and hence in the net motor excitation, so that the line current will increase sharply as indicated at 105c of Fig. 6. This sharp increase in the line current will bring the line current to the limiting value at the speed of operation, as indicated by the curve 103 of Fig. 6, so that the current limit circuit previously described will be brought into operation. Thus with the motor current limited at the current limit value, the motor power is determined by the motor voltage. The motor voltage is proportional to the motor speed and to the excitation of the motor field windings, so that with the motor speed remaining at the maximum value and the motor excitation severely limited by the increased energization of the motor exciter fields 90 and 91, the motor power will drop off, thereby to reduce the vehicle speed. When the vehicle speed is thus reduced, the tachometer voltage is reduced below the spill-over value and supplementary excitation of the motor exciter fields 90 and 91 ceases. It will thus be clear that the system will regulate on this point to maintain the vehicle speed at its maximum value.

Figure 5:
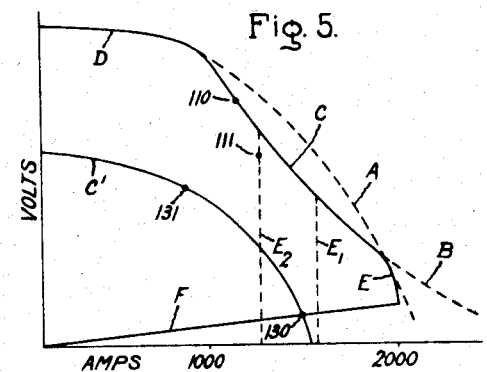

The above operation of the system under speed limit conditions will be clarified by a consideration of Fig. 5. This figure is a more or less conventional diagrammatic representation of the power characteristics of a Diesel-electric system. Thus the main generator 12, if driven at any selected speed, will exhibit an inherent full load volt-ampere characteristic of the general shape of the curve A, while the maximum power output of the engine 10 will be substantially constant as indicated by the curve B. Ordinarily the capacities of the various elements of the system are so selected that these curves intersect in the central operating range in order to attain maximum utilization of the available engine power over the widest possible range of vehicle speed. From the curves A and B it will be evident that within the central portion of the operating range the generator is demanding more power than the engine is capable of supplying and that the only way that the curves may be caused to coincide, as they must, is for the power output of the generator to be slightly diminished by slight engine stalling within this range. Since such reduction in the engine speed also cuts down the available power output from the engine, it is desirable if possible to cut down the generator demand so that it just equals the engine output.

In the present system provision is made for reducing the generator excitation by means of the governor operated potentiometer 46 previously described. By way of example, the curves A and B of Fig. 5 have been drawn for the full open position of the engine throttle. With the throttle in this position the potentiometer 46 has effected no change in the potential applied to the generator exciter field 41. However, as previously explained, the governor is provided with a certain degree of overtravel so that if, with the throttle in the full open position, the engine speed still cannot be maintained, the lever 29 attached to the governor moves the slide of the potentiometer 46 to effect a reduction in the energization of the generator exciter field winding 41 without further opening of the engine throttle. By thus reducing the excitation of the main generator 12, the power demand of the generator is reduced to a point where it just equals the available power output of the engine. This action is of a regulatory nature and results in bringing the generator volt-ampere characteristic into coincidence with the available power output of the engine over the constant power range C of the resultant generator volt-ampere characteristic shown in solid lines at Fig. 5. It will be understood that in the region D the voltage of the generator is limited to a predetermined maximum value by saturation of the generator field poles. The portion E on the curve of Fig. 5 is determined by operation of the current limit circuit at zero or low vehicle speed. It will be understood that as the vehicle speed increases, the current limit is reduced as indicated by the constant current lines $E_1$ and $E_2$ of Fig. 5. The portion F of the generator volt-ampere characteristic represents the pure resistance drop through the armatures of the traction motors along which the line current builds up in proportion to generator voltage when the vehicle starts from standstill.

Referring again to the operation of the vehicle speed limit with the curves of Fig. 5 in mind, it will be evident that, if the vehicle is operating at a point 110 on the generator volt-ampere characteristic when the vehicle speed reaches its maximum value, the sharp increase in motor exciter differential field excitation produced by the speed limit circuit and indicated at Fig. 7, and the consequent sharp increase in line current indicated at Fig. 6, will cause the operating point 110 of Fig. 5 to move down the curve C to the maximum speed current limit curve $E_2$, and hence down the current limit curve $E_2$ to a point such as 111 of Fig. 5. It will be clear that the system power represented at the point 111 is less than that represented by the constant power curve C so that the power output of the motors will be reduced and the vehicle will slow down as previously described.

*Stabilization of motor excitation*

It will be understood from the above that when the vehicle is moving forward under power, the counter-electromotive force of the motors is almost equal and opposite to the output voltage of the engine driven generator 12. Since the motor voltage is proportional to the product of the motor flux and motor speed, it is apparent that when the vehicle is traveling at a relatively high speed the motor flux is quite weak while the generator 12 is operating under partial saturation in its upper range of voltage. Under such conditions it will be evident that the motor exciters 14 and 15 are capable of forcing an extremely rapid change of motor field flux with only a relatively small change in motor field energization, while because of the generator field saturation, a relatively large voltage change at the generator exciter 13 is necessary to produce a proportional change in the generator field flux. Accordingly, if the excitation of the traction motors is suddenly reduced or reversed to initiate dynamic braking operation, it will be clear that a transient current of considerable magnitude might flow in the generator output circuit because of the fact that the motor field flux will reverse much more quickly than the generator flux can be reduced by operation of the current limit circuit. For the purpose of bringing this undesirable condition within permissible limits, the motor exciters 14 and 15 are provided with stabilizing control field windings 115 and 116, respectively. Referring to the drawings, it will be observed that the positive terminal of the motor exciter 15 and the negative terminal of the motor exciter 14 are connected together and to ground through a wire 117, while the positive terminal of the motor exciter 14 is connected through the stabilizing control field winding 115, a condenser 118, and the stabilizing control field winding 116 to the negative terminal of the motor exciter 15. Thus when the system is operating under steady-state conditions, no current flows through the stabilizing windings 115 and 116, the condenser 118 merely being charged to a potential equal to the sum of the potentials across the output terminals of the motor exciters 14 and 15. The stabilizing circuit is a loop circuit comprising the armatures of the motor exciters 14 and 15, the control field windings 115 and 116, and the condenser 118, all in series circuit relation, the circuit being tied to ground between the armatures of the motor exciters by the wire 117.

It may now be observed that if the voltages across the output terminals of both motor exciters are changing in the same sense, that is, if increased or decreased motoring or braking torque is simultaneously being called for on both exciters, or if the excitation of both exciters is suddenly and simultaneously changed from forward excitation to reverse excitation to shift from motoring to braking operation, the condenser 118 is charged or discharged (depending upon the direction of the change) through the stabilizing control field windings 115 and 116. These stabilizing windings are so arranged that the components of field excitation which they produce under such conditions of change in the motor exciters 14 and 15 tend to oppose the change of voltage in each machine. In this manner the rate of change of output voltage of the motor exciters is sufficiently decreased so that the generator exciter differential field 40 is able to make the flux of the generator field 38 follow the motor flux sufficiently closely to prevent an exceedingly high transient current during a rapid change of motor excitation. If, on the other hand, the voltage of only one of the motor exciters is changed, either by increasing or decreasing the field excitation of that motor while the voltage of the other motor exciter is maintained constant, the condenser 118 will also undergo a change in charge. In this case however the current through the stabilizing field windings 115 and 116 will be in the same direction in both windings, so that the current through the stabilizing winding of that motor exciter whose voltage is undergoing change will tend to oppose the change, while the current through the stabilizing winding of that motor exciter whose field excitation is not otherwise undergoing change will tend to produce a change in voltage of that exciter in a direction opposite to the voltage change in the first exciter. This latter effect is desirable in connection with steering operation, as will appear hereinafter. Steering is effected by moving one steering handle to change the torque of the associated motor. In order that maximum steering efficiency may be effected, means are preferably provided for automatically changing the torque of the other motor in the opposite direction without necessitating movement of the other steering handle. It will be clear that the above transient effect aids such a change.

Steering

As briefly mentioned in the foregoing paragraph, steering of the vehicle is effected by actuating one or the other of the steering handles to reduce or reverse the torque of the associated motor without similarly reducing the torque of the other motor, thereby causing the vehicle to turn toward the side upon which the torque is reduced or reversed. Referring to Fig. 1, if the steering handles are in the full forward motoring position shown, steering may be effected by pulling one handle, for example the right-hand steering handle 84, backward toward or to the null position. If very abrupt steering is required, the handle may be pulled back into the reverse quadrant to effect the reversal of torque and braking operation of the right-hand motor. During such operation the left-hand motor continues to exert a forward motoring torque. It will of course be understood that if the vehicle is traveling in the reverse direction, steering is effected by moving one handle toward or into the forward quadrant.

Figure 8:
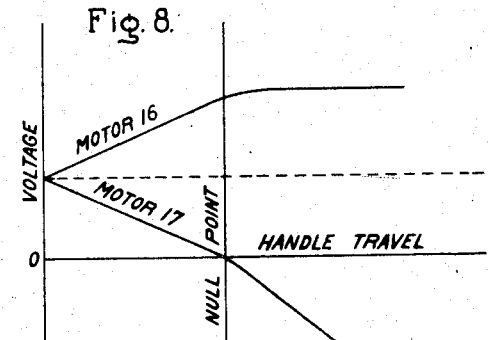

In order to effect steering with a minimum of disturbance of the main line current, it is desirable to maintain constant the net motor voltage during steering operations. Means are therefore provided for automatically increasing the excitation and hence the torque of the motor whose steering handle is not disturbed when the voltage and torque of the other motor is decreased. For example, if the steering handle 84 is drawn toward the null point of the potentiometer 75 while the steering handle 83 is left in the position shown, the resistance of the rheostat 79 will be gradually diminished and will be completely cut out when the handle 84 reaches the null point. Referring now to Fig. 4, it will be evident that as the rheostat 79 is cut out, the voltage applied to both double potentiometers 74 and 75 is gradually increased. Thus, since the steering handle 83 is not moved, it will be clear that the field excitation of the motor exciter 14 is increased, thereby to increase the voltage and torque of the motor 16. Of course, the voltage applied to the potentiometer 74 is also increased, but the reverse movement of the handle 84 takes precedence so that the resultant excitation of the motor exciter 15 is decreased, thereby decreasing the voltage and torque of the motor 17. By suitable proportioning of the various elements of the system, the rheostat 79 may be caused to increase the voltage of the motor 16 by the same amount that the voltage of the motor 17 is decreased by the steering handle 84 until the null point is reached and the rheostat 79 is completely cut out. This condition is illustrated at Fig. 8 which shows the relation between steering handle travel and motor voltage for the condition assumed. It will be clear that if the handle 83 is moved and the handle 84 left stationary, the rheostat 79 will have the effect of increasing the voltage of the motor 17.

Control of current limit by steering

To effect severe steering operation, one of the steering handles may be pulled into the reverse quadrant while the other handle is left in the forward quadrant of the associated potentiometers 74 and 75. For added maneuverability of the vehicle, the response to such a demand for abrupt steering is enhanced by providing a temporary increase in the forward torque upon the forward running track and an increase in the braking torque upon the reversed track. Such a temporary increase in the differential or steering torque is effected by boosting the current limit above the normal current limit value for the existing speed of operation in response to positioning of the steering handles in opposite quadrants.

Continuing with the example assumed, let it be supposed that the steering handle 84 is moved into the reverse quadrant. Referring now to Fig. 2, it will be evident from the foregoing description of the apparatus connected to the steering handle 84 that the selector switch 88 will have been thrown into engagement with the contact 121 as soon as the steering handle 84 was moved backward a predetermined small distance from its normal position, thereby to connect the terminal 67 of the rectifier bridge 58 to the tap 65 of the tachometer potentiometer 64 through the slider of the steering handle potentiometer 86, rather than through the slider of the steering handle potentiometer 85. This change in connection has no effect until the steering handle 84 reaches its null point, since the potentiometer 86 is effective only in reverse quadrant. However, as soon as the steering handle is moved into the reverse quadrant, the slider of the potentiometer 86 moves over the live section of the potentiometer, thereby gradually to reduce the tachometer voltage applied between the terminals 66 and 67 of the rectifier bridge 58. This reduction of voltage applied to the terminals 66 and 67 of the rectifier bridge 58 is effected by reason of the fact that the steering handle potentiometer 86 is connected in parallel circuit relation with that portion of the tachometer potentiometer 64 between the taps 65 and 65a. As the slider of the potentiometer 86 is moved in a clockwise direction as viewed at Fig. 2 toward its extreme reverse quadrant position, the voltage applied to the terminal 67 of the rectifier bridge 58 changed from that of the tap 65 on the potentiometer 64 to that of the tap 65a, thereby to reduce the differential voltage between the terminals 66 and 67. As the voltage between the terminals 66 and 67 is reduced, the unidirectional voltage between the terminals 62 and 63 of the rectifier bridge 58 is correspondingly reduced. It will be recalled from the foregoing description of the current limit circuit that the rectified tachometer voltage between the terminals 62 and 63 of the rectifier bridge 58 is connected in aiding relation to the voltage drop across the resistor 57 to oppose the voltage of the battery 45. It will be clear that as the rectified tachometer voltage is reduced by the action of the steering handle potentiometer 86, a progressively higher voltage drop across the resistor 57 is required to break down the rectifiers in the bridge 58 and produce current limit spillover through the battery 45.

It will be understood that, if the power demand is such that the vehicle is operating at the current limit, the temporary increase of current limit value resulting from movement of only the steering handle 84 into the reverse quadrant will increase both the forward torque on the motor 16 and the reversed or braking torque upon the motor 17. This increase in torque is occasioned primarily by the increased current, and to a lesser extent by increasing motor voltages.

Referring now to Fig. 8, it will be observed that the temporary boosting of the current limit beyond the null point permits a slight increase in the voltage of the motor 16 due to increased excitation of the current responsive exciter field winding 72. Increased excitation of the winding 72 is very slight, however, due to the limiting effect of a shunt circuit for the potentiometers 74 and 75 shown at Fig. 4 and to be described hereinafter. The limiting shunt circuit comes into operation soon after the actuated steering handle passes the null point and thereafter maintains substantially constant the excitation of the motor 16. Beyond the null point of the steering handle 84, however, the voltage of the motor 17 increases in a negative sense at a more rapid rate than that at which it decreased from its initial positive value to zero. This increased rate of change of voltage of the motor 17 is due to the fact that when the steering handle 84 passes the null point the rate of change of voltage of the motor 17 is due solely to movement of the steering handle 84, the potentiometer 79 now being ineffective to increase the voltage applied to the steering handle potentiometer 75. When the voltage of the motor 17 was positive such increasing applied voltage opposed the effect of steering handle movement.

It will be understood that, if, instead of moving the steering handle 84, the operator had moved the steering handle 83 into the reverse quadrant and left the steering handle 84 stationary, the potentiometer 85 would have produced the same effects as just described in connection with the potentiometer 86. In this connection, it will be observed from Fig. 2 that by such movement the switch 88 remains in the position shown, while the switch 87 is thrown into engagement with its fixed contact 120. Movement of the switch 87 has no effect, so that the terminal 67 of the rectifier bridge 58 remains connected to the tap 65 of the potentiometer 64 through the slider of the steering handle potentiometer 85. Thus, as the steering handle potentiometer 85 moves past the null point into the reverse quadrant, the tachometer voltage applied to the rectifier bridge 58 is reduced in the manner heretofore described.

Furthermore, if both steering handles are simultaneously moved into their reverse quadrants to effect braking operation without steering, both selector switches 87 and 88 are actuated; that is, the switch 88 engages the contact 121 and the switch 87 engages the contact 120, thereby completely to disconnect the steering handle potentiometers 85 and 86 and to connect the terminal 67 of the rectifier bridge directly to the tap 65 of the tachometer potentiometer 64. Thus, when the steering handles 83 and 84 are moved in unison, the steering handle potentiometers 85 and 86 are rendered ineffective to control the current limit value.

*Dynamic braking operation*

Dynamic braking operation without steering is effected by drawing both steering handles 83 and 84 simultaneously from their forward quadrants into their reverse quadrants. During this operation the potentiometers 85 and 86 are ineffective to raise the current limit because they are by-passed by the switches 87 and 88 as explained in the preceding paragraph.

However, the rheostats 78 and 79 are effective, so long as the steering handles are still in their forward quadrants, to increase the voltage applied to the motor field windings 70 and 71, as explained heretofore in connection with the steering operation. By thus increasing the standard of excitation of the motor fields, a high braking torque is maintained at relatively low line currents.

While the braking torque at low line currents is maintained in the manner described above, means are also provided for limiting the braking torque at high line currents. The need for such a limitation will be appreciated when it is realized that under braking conditions the field excitation of the traction motors 16 and 17 is reversed so that these motors act as generators, their voltages adding to the voltage of the main engine driven generator 12. Under these conditions the series excitation characteristic of the traction motors becomes a series generator characteristic having a marked cumulative effect; that is, as the excitation of the traction motors is increased in a braking sense, the line current is increased and as the line current increases, the excitation of the traction motors is further increased. This effect is aggravated by the transient current discussed above in connection with the motor exciter stabilizing windings. It will be recalled that transients due to the inability of the generator to reduce its voltage as quickly as the motor voltage is reduced are apt to cause temporary overshooting of the current limit. While the motor exciter stabilizing windings 115 and 116 limit this overshooting to permissible values, it is also desirable to limit the braking torque when such high line currents exist. Indeed, it has been found desirable to limit the braking torque at high line current even though the line current does not exceed the current limit value. For this purpose we provide means for limiting the excitation of the traction motors 16 and 17 to a predetermined maximum value so that the series excitation characteristic of the traction motors is transferred to a constant or shunt excitation characteristic upon the occurrence of a predetermined high line current. Fig. 4 shows the manner in which the energization of the main motor exciter control field windings 72 and 73 is limited to a definite maximum value. As has been previously pointed out, Fig. 4 shows the potentiometer bridge 74 (the potentiometer bridge 75 being connected in parallel circuit relation) connected across the interpole windings 18, 19 and 20 in the generator output circuit in series with the resistor 76 and the rheostats 78 and 79. Furthermore, it will be now understood that normally the basic series characteristic of the motor exciter winding 72 arises from the fact that the potential at the point 80 of the potentiometer 74 is proportional to the voltage drop across the commutating pole windings 18, 19 and 20 as derived through the resistor 76, 78 and 79. As explained heretofore, this proportionality is modified to some extent in braking operation by reduction of the resistance of the rheostats 78 and 79. However, in order to limit the potential at the point 80 to a predetermined maximum value, this point is tied through a blocking rectifier 126 to a point of intermediate voltage 127 on the battery 45. From Fig. 1 it will be evident that the point 127 has a fixed potential slightly above ground potential as determined by the battery 45. So long as the potential of the point 80 remains below that of the point 127 on the battery 45, current cannot flow from the battery through either the potentiometer or the commutating pole windings 18, 19 and 20 because of the presence of the blocking rectifier 126. However, should the line current through the commutating pole windings 18, 19 and 20 attain such a value that the potential at the point 80 tends to attain a value in excess of the potential at the point 127, current will spill over from the point 80 through the rectifier 126 and the connected portion of the battery 45 to ground, thereby limiting the potential of the point 80 to a predetermined maximum value. After this operation the potential of the point 80 remains substantially fixed regardless of the value to which the line current, and hence the potential drop across the commutating pole windings 18, 19 and 20, may go. Therefore, when the line current attains a value sufficient to cause such spill-over, the energization of the motor exciter control field windings 72 and 73 and accordingly the excitation of the traction motors 16 and 17, attains a fixed maximum value and is possessed of a shunt characteristic. In this manner the undesirable cumulative effects of motor field strength are minimized when going into dynamic braking operation. It will be understood that the excessive potential at the point 80 may not be due alone to a simple resistance drop across the commutating pole windings 18, 19 and 20, but that upon a very rapid change in line current, as due to a quick reversal of the traction motor field windings, such an excessive potential may arise in part from the inductive drop across the commutating pole windings. The spill-over circuit through the rectifier 126 also guards against such excessive inductive transient potentials.

Under conditions of rapidly changing line current in suddenly going into braking operation as described above, the inductive potential appearing across the interpole field windings 18, 19 and 20 is utilized to hasten the decrease in excitation of the generator 12 to its steady-state value. For this purpose the energization of the differential field winding 40 of the generator exciter 13 is arranged to go to exceedingly high values. It will be recalled that the differential field winding 40 of the exciter 13 is energized across the commutating pole windings 18, 19 and 20 so that any inductive voltage drop appearing at the positive terminal of the generator 12 will provide a transient increase in energization of the winding 40 and hence a rapid decrease in the net excitation of the generator exciter 13 and the generator 12. By forcing an increased current through the differential field winding 40, the inductive voltage at the positive terminal of the generator 12 also appears across the resistor 57 in the generator exciter differential excitation circuit and tends to bring into operation the line current limit circuit previously described, so that the energization of the generator exciter differential control field 40 may be further increased by spill-over of the current limit circuit through the rectifier bridge 58 and the battery 45, as previously described.

Operation

In view of the foregoing detailed description of the various parts of the system and of their manner of connection and mode of operation, the operation of the system as a whole will be readily understood from the following brief description from the viewpoint of the operator.

Three simple and convenient controls are provided at the driver's position, namely, the accelerator pedal 26 for controlling the speed and power output of the internal combustion engine 10, and the left and right steering handles 83 and 84, respectively, for independently controlling the speed, torque, and direction of rotation of the left and right-hand tracks. As previously described, the steering handles 83 and 84 are provided with dead man interlocks 53 and 54 normally biased to an open position.

Assuming first that the vehicle is at standstill and that the engine 10 is running at idling speed, motoring operation is initiated simply by grasping one or both of the steering handles to close one or both of the dead man interlocks 53, 54. The interlocks 53, 54 are connected in parallel circuit relation, and closure of either interlock completes an energizing circuit for the main control field winding 41 of the generator exciter 13 through a circuit which has been previously traced. Simultaneously an energizing circuit is completed from the positive terminal of the battery 45 through an actuating coil 130 of the throttle solenoid 37 to the wire 52 and through the dead man interlocks 53 and 54 to ground. This circuit also includes a normally closed interlock contact 131 on an overspeed device 132. The overspeed device 132 is arranged to be actuated upon overspeeding of the engine 10 to de-energize the throttle solenoid 37. As has been explained hereinbefore, actuation of the throttle solenoid 37 adjusts the setting of the governor 25 to maintain a predetermined minimum running speed of the engine 10, thereby to assure adequate power for steering or braking even though the accelerating pedal 26 should be accidentally released.

Closure of one of the dead man interlocks 53, 54 to initiate motoring operation also completes an energizing circuit through a reverse power relay RPR for an actuating coil 135 of the braking contactor B. The braking contactor B is normally open, but is closed during motoring operation to shunt the braking resistor 21 in the main generator output circuit. The reverse power relay RPR is provided with a polarizing winding 136 and a directional winding 137. Upon closure of one of the dead man interlocks 53 or 54, an energizing circuit is completed for the polarizing winding 136 from the wire B+ through a normally closed interlock contact 138 on the braking contactor B and the winding 136 to the wire 52 and hence to ground. When so energized, the reverse power relay RPR picks up and is retained in its actuated position by a holding current of limited value through a resistor 139 which shunts the normally closed interlock contact 138. Upon actuation of the relay RPR an energizing circuit is completed for the actuating winding 135 of the braking contactor B through a circuit which may be traced from the wire B+ through a normally open interlock contact 140 on the reverse power relay RPR, the actuating winding 135 of the braking contactor B, a normally closed interlock contact 141 on the braking contactor B, and a normally closed interlock contact 142 on a time delay relay TDR to ground. Thus energized the braking contactor B picks up to close the shunting contact 22 around the braking resistor 21 and to complete for its actuating coil 135 a holding circuit through a current limiting resistor 143 and a self-actuated normally open interlock contact 144. After the contactor B picks up it closes a circuit for an actuating coil 155 of the time delay relay TDR through the interlock contact 49 on the contactor B. Opening of the time delay relay contact 142 has no effect for the present because it is now shunted by the lock-in contact 144 on the contactor B.

By way of summary then, simple closure of one or the other of the dead man interlock contacts 53 or 54 immediately increases the engine speed to a predetermined minimum, picks up the braking contactor B to shunt the braking resistor 21, and completes a field excitation circuit for the generator exciter 13. The consequent current flowing in the output circuit of the generator 12 produces a voltage drop across the commutating field windings 18, 19 and 20 and thus energizes the main control field windings 72 and 73 of the traction motor exciters 14 and 15 through the potentiometer bridges 74 and 75, respectively, so that a torque is supplied to the driving wheels. Since the steering handles 83 and 84 are in their position of maximum forward torque, the vehicle will begin to accelerate from standstill in the forward direction. As the vehicle comes up to speed, the motor current falls off and the voltage rises from a point 130 on the IR line F of Fig. 5 and along a low engine power curve C' to some point such as the point 131. It will be understood that as the line current diminishes, the motor torque also diminishes so that the point 131 is determined as that point at which the total motor torque just overcomes the resistance to motion of the vehicle.

With the establishment of a current in the generator output circuit, the directional winding 137 of the reverse power relay RPR is energized in proportion to the motor voltage and cumulatively with respect to the polarizing winding 136 of the reverse power relay. The winding 137 thus tends to hold the reverse power relay in its actuated position.

To increase the speed of the vehicle the accelerator pedal 26 must be depressed. The engine 10 is thereby speeded up and its power increased, thus increasing the generator output current and the motor torque. The vehicle will therefore speed up until the increased motor torque just balances the resistance of the terrain over which the vehicle is operating. It should be noted that the speed of the vehicle cannot be increased simply by moving the steering handles forward (assuming that they had previously been removed from the maximum forward position) to increase the motor excitation. This will be evident from a consideration of the fact that no greater power is thereby supplied to the motor since the generator power output is not changed by moving the steering handles. The only effect of moving the steering handles forward simultaneously is to increase the motor voltage and thus decrease the motor current so that the operating point moves along one of the constant horsepower curves such as that shown in Fig. 5 to a higher voltage point.

If during forward motoring operation the accelerator pedal is depressed sufficiently far to increase the vehicle speed to its predetermined maximum value, the speed limit circuit functions in the manner heretofore described to diminish the excitation of the traction motors and to give a visual or audible indication at the overspeed indicating device 108. The operation of the speed limit circuit and its relation to the current limit feature has been explained hereinbefore. So far as the operator is concerned the functioning of the speed limit circuit and an indication on the overspeed device 108 should be taken as a signal for releasing the accelerator pedal to some extent, thereby to reduce the power output of the engine and to permit the system operating point to move off of the current limit. This is desirable, as obviously it is more efficient to operate the system at low current and high voltage than to operate at low voltage at high current.

An outstanding feature of the described arrangement is that, in the event that the vehicle while motoring forward encounters a downhill grade and the operator makes no attempt to check the vehicle speed, the speed limit protection will operate not only to reduce the engine horsepower output in the manner previously explained but will actually reverse the net excitation of the traction motor field windings thereby automatically to initiate dynamic braking operation and to maintain the vehicle at the maximum permissible speed. To illustrate, let it be assumed that the vehicle is brought to a steep downhill grade with the engine 10 running at its maximum speed and the steering levers 83 and 84 pushed forward to their maximum torque positions as shown at Fig. 1. As the vehicle speed increases the voltage of the tachometer generator 60 will become so great that the current spilled over from the tachometer generator through the battery 45 and the motor exciter differential windings 90 and 91 will become sufficient completely to overpower the main control field windings 72 and 73 and to reverse the net excitation of the motor exciters 14 and 15 and the motors 16 and 17 thereby to initiate dynamic braking operation.

The manner in which the vehicle may be steered by reducing or reversing the torque on one or the other of the motors has been previously described. Also, dynamic braking without steering by simultaneous transfer of the steering handles 83 and 84 to their reverse quadrants has been explained with reference to the motor field excitation circuit. It may now be noted that when such dynamic braking operation is initiated the back electromotive force of the traction motors 16 and 17 is reduced to zero and then reversed. As the back electromotive force of the traction motors approaches zero or begins to reverse in going into braking the directional coil 137 of the reverse power relay RPR functions to drop out the reverse power relay thereby to deenergize the actuating coil 135 of the braking contactor B and to cause the contactor B to drop out and unshunt the braking resistor 21. During dynamic braking operation the power generated by the generator 12 and the traction motors 16 and 17 is absorbed in the braking resistor. Proper operation of the reverse power relay RPR is ensured by a pair of capacitors 150 and 151 connected across a resistor 152 in the circuit of the directional coil 137. These capacitors function to cause the reverse power relay to anticipate its normal setting sufficiently so that even when the rate of change of motor voltage is greatest the braking contactor B is opened at the desired time. As braking proceeds with the motor voltage reversed the reverse power relay RPR remains dropped out and the braking contactor B likewise remains deenergized. As the motor voltage decreases with decreasing vehicle speed the voltage of the main generator 12 increases to maintain the continuing unidirectional current in the main line circuit. Since the current in both the motor armatures and the motor field windings is maintained, dynamic braking may be made effective until the vehicle reaches standstill.

Opening of the braking contactor B indicating that dynamic braking is in progress also effects a number of protective functions necessitated by braking operation. In the first place the interlock contact 59 of the contactor B disables the current limit circuit thereby to remove the current limit effect during dynamic braking. This will be evident from Fig. 2, and is necessitated by the fact that the voltage of the engine driven generator 12 cannot be permitted to reverse under the influence of the differential exciter field winding 40 in an attempt to maintain the line current at the current limit value. If the generator voltage were permitted to reverse it would mean that the generator was acting as a motor to drive the internal combustion engine 10. While slight overspeeding of the engine 10 is permissible, any substantial overspeeding must be avoided in order to prevent damage to the engine. A second normally closed interlock 153 is also included on the braking contactor B for the same reason. When the braking contactor drops out the interlock 153 shunts the resistor 55 to insure that maximum forward field is maintained on the generator exciter 13. Unless the generator exciter forward field 41 is kept at its maximum value during braking it is possible that even the minimum strength of the generator differential field 41 would be sufficient to cause the reversal of the main generator voltage and overspeeding of the engine 10.

It is also to be noted that during braking the interlock contact 138 on the contactor B is closed to shunt the holding resistor 139 in circuit with the reverse power relay polarizing coil 136 thereby to change the calibration of the reverse power relay and to restore its normal pickup circuit. The interlock contact 141 on the braking contactor B also closes during dynamic braking to short circuit the holding resistor 143 in series with the actuating coil 135 of the braking contactor and to restore the normal pickup calibration of the braking contactor.

During dynamic braking operation while the reverse power relay RPR remains dropped out energization of the braking contactor coil 135 is precluded by the time delay relay TDR, the actuating winding 155 of which is maintained energized through a normally closed interlock contact 156 on the reverse power relay RPR which shunts the now open interlock contact 49 on the contactor B. When dynamic braking is completed and the vehicle speed is reduced to zero, the RPR relay recognizes this fact by the fact that the motor voltage is substantially zero. The reverse power relay then picks up and deenergizes the forward field winding 41 of the generator exciter 13 at the RPR interlock contact 156. Opening of the contact 156 also deenergizes the time delay relay TDR. The time delay relay, however, does not immediately drop out. Thus for a short time the generator exciter 13 is energized only by its differential field winding 40 and its voltage is rapidly brought to zero. After a suitable time which is just sufficient to allow the line current to come approximately to zero, the time delay relay TDR drops out and closes its interlock contact 142. Closure of the contact 142 completes an energizing circuit for the braking contactor B and contactor B picks up and locks itself in through its interlock contact 144. It will be understood, of course, that at this time the operator will release the dead man handle interlocks 53 and 54 and return the steering handles 83 and 84 to their biased normal position. If the operator retains the handles in the braking position, the reenergization of the braking contactor B will complete an energizing circuit for the generator forward field winding through its interlock contact 49 and initiate reverse motoring operation.

Referring now to Fig. 4 the purpose of a blocking rectifier 160, not previously mentioned, will become evident. The rectifier 160 is located between the points 80 and 81 of the potentiometer bridges 74 and 75 and ground, and has for its purpose the prevention of a reverse current in the main line circuit. Let us assume, for example, that the steering handles 83 and 84 are moved to braking position with the dead man handle interlocks 53 and 54 open. Under these conditions the forward field 41 of the generator exciter 13 would be disabled so that there would be nothing to determine the direction of current flow in the generator output circuit. A reverse line current can start in the system, and under such conditions the reverse power relay RPR would pick up under the influence of the winding 137 alone and cause closure of the braking contactor B. Under such conditions the traction motors 16 and 17 would build up as series generators as desired but without the braking resistor 21 in the main line circuit, so that all the power would be absorbed in the generator 12 thereby causing the generator to overspeed the engine 10. The blocking rectifier 160 serves to prevent the motors from receiving any excitation due to a reversed line current, so that braking under such conditions is not possible. Thus at Fig. 4 it will be evident that if the potential of the grounded wire exceeds the potential of the point 81, as due to a reversal of line current, the potentiometers 74 and 75 will be short circuited through the blocking rectifier 160.

From the foregoing it will be clear that we have provided an extremely flexible electric power system and motor control system of general application which, when used in its entirety, possesses particularly attractive features for application to a track laying vehicle. The system is remarkable for its speed of response and for its absolute protection against overload without regard to the severity of requirements imposed upon it by the operator. These virtues, and particularly the speed of response, are due primarily to the refined limiting and control circuits applied in conjunction with an electric power system in which a continuing controlled unidirectional current of limited magnitude is maintained at all times in a motor armature circuit during both motoring and dynamic braking operations while the speed, torque, and direction of rotation of each motor are independently controlled through its low power field excitation circuit.

While we have described only one preferred embodiment of our invention by way of illustration it will be evident that many modifications will occur to those skilled in the art and that we, therefore, intend by the appended claims to cover all such modifications as fall within the true spirit and scope of our invention.

What we claim as new and desire to secure by Letters Patent of the United States is:

1. A motor control system comprising a direct current generator arranged to supply current to an output circuit, a pair of direct current motors having armatures and field exciting windings, said armatures being connected in series circuit relation in said output circuit, excitation means for said generator, means responsive to the current in said output circuit for controlling the excitation of said generator to limit said current to a selectable maximum value, separate manually controllable means for supplying independently variable excitation currents to said motor field exciting windings thereby separately to control the magnitude and direction of motor torques, and control means automatically operable upon movement of one of said manually controllable means without like movement of the other said means to control said maximum current limit value in accordance with such movement.

2. A motor control system for steering an electrically driven vehicle having laterally spaced driving elements comprising an electric traction motor connected to drive each of said driving elements, each of said motors including an armature and a field exciting winding, a direct current generator connected to supply current to said motor armatures in series circuit relation, excitation means for said generator, means responsive to the current in said motor armatures for controlling the excitation of said generator to limit said current to a selectable maximum value, means for energizing said motor field windings to excite said motors, separate manually operable means movable to vary and reverse independently the energization of said motor field exciting windings thereby separately to control the magnitude and direction of motor torques, and control means automatically operable upon response to demand for a predetermined minimum differential torque between said motors to increase said differential torque thereby to enhance the steering response of said vehicle.

3. A motor control system comprising a direct current generator arranged to supply current to an output circuit, a pair of direct current motors having armatures and field exciting windings, said armatures being connected in series circuit relation in said output circuit, excitation means for said generator, means responsive to the current in said output circuit for controlling the excitation of said generator to limit said current to a selectable maximum value, means for energizing said motor field exciting windings to excite said motors, separate manually operable means movable to vary independently the energization of said field exciting windings thereby separately to control the magnitude and direction of motor torques, control means automatically operable upon movement of only one of said manually operable means beyond a predetermined point in its travel to control said maximum current limit value, and means actuable in response to movement of both said manually operable means beyond said predetermined points for rendering said control means ineffective to control said current limit value.

4. A motor control system comprising a direct current generator arranged to supply current to an output circuit, a pair of direct current motors having their armatures connected in said output circuit, excitation means for said generator, separate manually controllable, means for supplying independently variable excitation currents to said motors, means responsive to the current in said output circuit for reducing the excitation of said generator to limit the current in said circuit to a selectable maximum value, and control means operable upon movement of only one of said manually controllable means beyond a predetermined point in its travel automatically to increase said maximum current value.

5. A motor control system comprising a direct current generator arranged to supply current to an output circuit, a pair of direct current motors having their armatures connected in series circuit relation in said output circuit, excitation means for said generator, separate manually controllable means for supplying independently variable excitation currents to said motors thereby separately to control the motor torques, and means automatically responsive to a demand for a predetermined differential between said motor excitation currents to increase the torque differential between said motors.

6. A motor control system comprising a direct current generator arranged to supply current to an output circuit, a pair of direct current motors having their armatures connected in series circuit relation in said output circuit, excitation means for said generator, separate manually controllable means for supplying independently variable excitation currents to said motors thereby separately to control the motor torques, means responsive to the current in said output circuit for reducing the excitation of said generator to limit the current in said circuit to a selectable maximum value, and control means rendered operable in response to a demand for a predetermined differential torque between said motors for increasing said current limit value thereby to increase said differential torque.

7. A motor control system comprising a direct current generator arranged to supply current to an output circuit, a pair of direct current motors having their armatures connected in said output circuit, excitation means for said generator, separate manually controllable means for supplying independently variable excitation currents to said motors, means responsive to the current in said output circuit for reducing the excitation of said generator to limit the current in said circuit to a selectable maximum value, control means operable upon movement of only one of said manually controllable means to reverse the excitation of the associated motor for increasing said maximum current limit value, and means responsive to similar movement of both said manually controllable means for rendering said control means ineffective to control said maximum current value.

8. A motor control system comprising a direct current generator arranged to supply current to an output circuit, a pair of direct current motors having their armatures connected in series circuit relation in said output circuit, excitation means for said generator, separate manually controllable means for supplying independently variable and reversible excitation currents to said motors thereby separately to control the magnitude and direction of the motor torques, and means automatically operable upon reversal of the torque of only one of said motors to increase the differential torque between said motors.

9. A motor control system for an electrically driven vehicle provided with laterally spaced driving elements comprising a direct current generator, arranged to supply current to an output circuit, an electric traction motor drivingly connected to each of said driving elements, each of said motors including an armature and a field winding, means for connecting said armatures in series circuit relation in said output circuit, excitation means for said generator, separate manually controllable means for supplying independently variable excitation currents to said motors thereby separately to control the magnitude and direction of motor torques, and means responsive to reversal of the torque of only one of said motors for increasing the differential torque between said motors thereby to enhance the steering response of said vehicle.

10. A motor control system comprising a direct current generator connected to supply current to an output circuit, a pair of direct current motors having their armatures connected in series circuit relation in said output circuit, differential excitation means for controlling the excitation of said generator in accordance with the current in said output circuit, said differential excitation means comprising a current responsive element and a resistor connected in series circuit relation across a portion of said output circuit, means for limiting the current in said output circuit to a selectable maximum value comprising a unidirectionally conducting shunt circuit for said resistor including a source of bias potential disposed in said shunt circuit to oppose the voltage drop across said resistor, separate manually controllable means for supplying independently variable and reversible excitation currents to said motors, and control means operable upon movement of either of said manually movable means beyond a predetermined point in its travel for controlling said source of bias potential to increase said maximum current limit value.

11. A motor control system comprising a direct current generator arranged to supply current to an output circuit, a pair of direct current motors having their armatures connected in series circuit relation in said output circuit, a field exciting winding for said generator, an auxiliary dynamoelectric machine connected to supply excitation current to said field exciting winding, means for reducing the excitation of said generator in accordance with the current in said output circuit comprising a differential field exciting winding for said dynamoelectric machine connected in series circuit relation with a current limiting resistor across a portion of said output circuit, means for limiting the current in said output circuit to a selected maximum value comprising a source of substantially constant bias potential connected in a unidirectionally conducting shunt circuit across said resistor to oppose the voltage drop across said resistor, separate manually controllable means for supplying independently variable excitation currents to said motors, means for selecting the current limit in said output circuit comprising a second source of bias potential connected in said unidirectionally conducting circuit in aiding relation to the voltage drop across said resistor, and control means operable upon movement of only one of said manually movable means beyond a predetermined limiting range of its movement without similar movement of the other of said manually controllable means automatically to control said second source of bias potential to increase said current limit value in accordance with the difference of said motor excitation currents.

12. A motor control system for an electric vehicle comprising a direct current generator arranged to supply current to an output circuit, a plurality of direct current traction motors having their armatures connected in series circuit relation in said output circuit, separately excited individually controllable field excitation means for each of said motors, means for limiting the current in said output circuit to a selectable maximum value independently of the effective resistance of said motor armatures, and control means operable upon reversal of the excitation of only one of said motors to increase said current limit value.

13. A motor control system for an electric vehicle comprising a direct current generator arranged to supply current to an output circuit, a plurality of direct current traction motors connected to laterally spaced driving elements of said vehicle and having their armatures connected in series circuit relation in said output circuit, separately excited individually controllable field excitation means for each of said motors, means for limiting the current in said output circuit to a maximum value selected in accordance with the speed of said vehicle independently of the effective resistance of said motor armatures, and control means operable upon reversal of the excitation of either of said motors without reversal of the excitation of the other of said motors to increase the current limit value at the instantaneous speed of operation.

14. A motor control system for a self-propelled electric vehicle comprising a direct current generator arranged to supply current to an output circuit, a plurality of direct current traction motors connected to laterally spaced driving wheels of said vehicle and having their armatures connected in series circuit relation in said output circuit, separately excited individually controllable field excitation means for each of said motors, means for limiting the current in said output circuit to a selectable maximum value independently of the effective resistance of said motor armatures, control means operable upon reversal of the excitation of either of said motors to increase the current limit value at the instantaneous speed of operation, and means operable in response to substantially simultaneous reversal of the excitation of both said motors for rendering said control means ineffective to modify said current limit value.

15. A control system for an electrically driven vehicle comprising a direct current generator connected to supply current to an output circuit, a pair of direct current motors connected to laterally spaced driving wheels of said vehicle and having their armatures connected in series circuit relation in said output circuit, differential excitation means for controlling the excitation of said generator in accordance with the current in said output circuit, said differential excitation means comprising a current responsive element and a resistor connected in series circuit relation across a portion of said output circuit, means for limiting the current in said output circuit to a selectable maximum value comprising a unidirectionally conducting shunt circuit for said resistor including a source of bias potential operatively connected in said shunt circuit to oppose the voltage drop across said resistor, separate manually controllable means for supplying independently variable and reversible excitation currents to said motors, a pair of potentiometers connected in parallel circuit relation across said source of bias potential and each actuable by one of said manually controllable means to reduce the bias potential applied to said shunt circuit, means including switching means operable in response to movement of one of said manually controllable means to reverse the excitation of one of said motors selectable to render one of said potentiometers effective to increase said maximum current limit value, said switching means being operable upon like excitation reversing movement of both said manually controllable means to render said potentiometers ineffective to control said maximum current limit value.

GEORGE M. ADAMS.
JOHN C. AYDELOTT.